Feb. 9, 1960 R. D. SLAYTON 2,924,658

SYNCHRONOUS ELECTRONIC MULTIPLEX TELEGRAPH CIPHERING SYSTEM

Original Filed May 26, 1952 5 Sheets-Sheet 1

INVENTOR
RANSOM D. SLAYTON
BY Emery Robinson
ATTORNEY

INVENTOR
RANSOM D. SLAYTON
BY Emery Robinson
ATTORNEY

SYNCHRONOUS ELECTRONIC MULTIPLEX TELEGRAPH CIPHERING SYSTEM

Original Filed May 26, 1952

INVENTOR
RANSOM D. SLAYTON
BY Emery Robinson
ATTORNEY

Feb. 9, 1960 R. D. SLAYTON 2,924,658

SYNCHRONOUS ELECTRONIC MULTIPLEX TELEGRAPH CIPHERING SYSTEM

Original Filed May 26, 1952

5 Sheets-Sheet 4

INVENTOR
RANSOM D. SLAYTON
BY Emery Robinson
ATTORNEY

INVENTOR
RANSOM D. SLAYTON
BY Emery Robinson
ATTORNEY

United States Patent Office 2,924,658

Patented Feb. 9, 1960

2,924,658

SYNCHRONOUS ELECTRONIC MULTIPLEX TELEGRAPH CIPHERING SYSTEM

Ransom D. Slayton, Glenview, Ill., assignor to Teletype Corporation, Chicago, Ill., a corporation of Delaware Continuation of application Serial No. 289,996, May 26, 1952. This application July 9, 1957, Serial No. 672,536

6 Claims. (Cl. 178—22)

This invention relates to synchronous electronic multiplex telegraph ciphering systems and more particularly to a multiplex ciphering system wherein the transmission of cipher code signals over a telegraph channel are suppressed during periods in which there are no intelligence message signals being supplied to that particular multiplex channel in the system.

This application is a continuation of abandoned application Serial No. 289,996, filed May 26, 1952.

There are many cipher systems in present use for enciphering and deciphering intelligence messages by employment of key cipher tapes located at the transmitting and receiving ends of the system. These cipher tapes are of identical nature and are simultaneously prepared by perforating the two tapes in accordance with a random series of telegraph signals. In operation of such systems, intelligence telegraph signals are generated at the transmitting station and are enciphered by superimposing the signals contained in the key cipher tape on the intelligence signals to produce enciphered signals resembling neither the generated intelligence signals nor the cipher signals obtained from the key cipher tape. The enciphered signals are then transmitted and received by standard receiving equipment which decipher the received signals by applying signals generated in accordance with the key cipher tape located at the receiving stations to the received enciphered signals to produce intelligence signals identical in nature with the original intelligence signals generated at the transmitting station. The deciphered signals are thereafter utilized to operate any sort of printing or recording telegraph apparatus. In the present invention the intelligence code utilized for the transmission of messages is in accordance with the Baudot code which is a code having five intelligence impulses which represent each intelligence signal. However, it is to be understood that the principles of the present invention may be applied to other telegraph systems utilizing other than the Baudot code.

It is readily apparent that to obtain a proper operation of these ciphering systems, the key cipher tapes located at both the transmitting and receiving stations must be advanced in synchronization following the transmission and reception of each enciphered signal. In operation of some ciphering systems utilizing key cipher tapes a relatively short cipher tape is utilized and hence the cipher signals derived from the ciphering tape are repeated after an interval of transmission. Thus, it is of paramount importance that the signals contained in the cipher tape be maintained in utmost secrecy during periods in which no intelligence signals are being fed into the system otherwise the transmission of the cipher code may be intercepted and further use of the key cipher tape is useless. An important criterion which, therefore, presents itself is the suppression of the cipher signals generated in accordance with the perforations in the key cipher tape during periods in which no intelligence signals are being applied to the system for transmission.

It is a primary object of this invention to provide a simple and expeditious ciphering system wherein the ciphering and deciphering apparatus is maintained in synchronization at all times.

An object commensurate with the primary object resides in the provision of a system to effectuate the suppression of cipher signals during periods in which no intelligence message signals are being applied to the system.

A further object of the invention is to utilize electronic expedients wherever possible to accomplish the cardinal objects of the invention.

An additional object of the invention resides in the provision of means for initiating the enciphering and deciphering apparatus to operate at the same rate as determined by constant frequency sources.

Another object of the invention is to provide means for initiating operation of the enciphering and deciphering apparatus without the loss of any characters in the system.

Another object of the invention is to control the synchronous advancement of the enciphering and deciphering apparatus independently of the application of any intelligence message signals.

A more specific object of the invention is to provide means under the control of the transmitting and receiving distributors for generating control impulses to synchronously actuate the enciphering and deciphering apparatus.

Another feature of the invention is to provide a ciphering system which continually operates in synchronism regardless of traffic conditions and which can at any time accommodate random intelligence signals for encipherment and transmission.

Another and more definite feature of the invention is the utilization of a special impulse accompanying each intelligence signal for controlling the application of any signals to a transmitting distributor.

In conformity with this last feature it is also an object of this invention to provide a system wherein the transfer of the key cipher system is under the control of the special impulse accompanying each intelligence signal.

With these and other objects in view the present invention contemplates a ciphering system operated on a multiplex basis utilizing distributors of the general type shown in the United States Patent No. 2,595,656, granted to Mr. T. A. Hansen on May 6, 1952. These distributors are readily adapted for use in ciphering systems wherein synchronous operation is of utmost importance because the distributors as shown in the Hansen patent are controlled by crystal oscillators or from other constant frequency sources and hence synchronization between the transmitting and receiving distributors is assured at all times. The present invention also contemplates the use of signal converters such as shown in the United States patent to R. D. Slayton No. 2,582,218, issued January 15, 1952, for converting standard start-stop intelligence signals into signals having an intelligence portion followed by a sixth pulse which is invariably of the same character.

Generally, in operation of the present invention, intelligence signals are transferred from the signal converter to an enciphering device under the control of operating pulses generated by the transmitting multiplex distributor. Each signal is enciphered by the enciphering apparatus, but is transferred to the transmitting distributor only upon reception of the sixth pulse by the enciphering device. If for some reason or other, such as the failure of the converter to receive an intelligence signal, the enciphering device does not receive a sixth pulse, then the enciphering device does not transfer any signals to the transmitting distributor. It is proposed in the present invention to utilize a key tape for controlling the enciphering device; however, other enciphering means may be utilized such as cam controlled enciphering devices.

The advance of the key tape through the enciphering device is under the control of operating pulses generated within the transmitting distributor and, manifestly, since the pulses are continuously generated under the control of the crystal oscillator the key tape will be invariably advanced at a continuous rate regardless of the fact that no intelligence signals are being received by the code converter. However, if no intelligence signals are received, then no sixth or ultra codal control pulses are supplied by the converter to the enciphering device and, consequently, the ciphering signals produced in accordance with the key cipher tape are not transferred to the transmitting distributor. This prevents the transmission of the plain key message, and removes the danger of its subsequent interception.

The operation of the transmitting apparatus may be briefly summarized by stating that the key cipher tape is invariably advanced by the operating pulses generated by the transmitting distributor. However, the transfer of any signals to the transmitting distributor is contingent upon the reception of a sixth or ultra codal control pulse by the enciphering apparatus, said sixth or ultra codal pulse accompanying only those code groups received as actual traffic at the input side of the code converter.

At the receiving station a distributor, such as disclosed in the afore-identified Hansen patent, is employed to receive the enciphered code signals. The enciphered signals are transferred to a deciphering apparatus, which may be of the key tape type, where the enciphered signals are deciphered and then are applied to a signal converter, such as shown in the United States patent to R. D. Slayton No. 2,536,578 issued January 2, 1951, where the deciphered intelligence signals are converted back into start-stop signals which are identical to the intelligence signals originated at the transmitting station. The key tape in the deciphering apparatus is advanced under the control of the receiving distributor which is controlled by a crystal oscillator to continuously and periodically produce and apply operating pulses for operating the key tape advancing mechanism in synchronism with the key tape advancing mechanism at the transmitting station. The control impulses periodically generated by the receiving distributor are also utilized to control the operation of the signal converter. The sixth or ultra codal control pulse accompanying each enciphering signal is utilized by the deciphering apparatus to control the transfer of the deciphered signals from the deciphering apparatus to the code converter or other terminal equipment. Upon failure of the deciphering apparatus to receive the sixth or ultra codal control pulse, which will occur when no enciphered signals are being transmitted by the system, the key cipher signals generated by the deciphering apparatus in accordance with the perforations in the key cipher tape are not transferred to the signal converter and hence any spurious or meaningless operation of the terminal equipment is prevented.

Other objects and advantages of the present invention will be apparent from the following detailed description when considered in conjunction with the accompanying drawings wherein:

Fig. 3 is a block diagram showing the manner in which Figs. 4 and 5 are to be arranged to illustrate an enciphering circuit embodying the details of the invention;

Figures 3, 5:
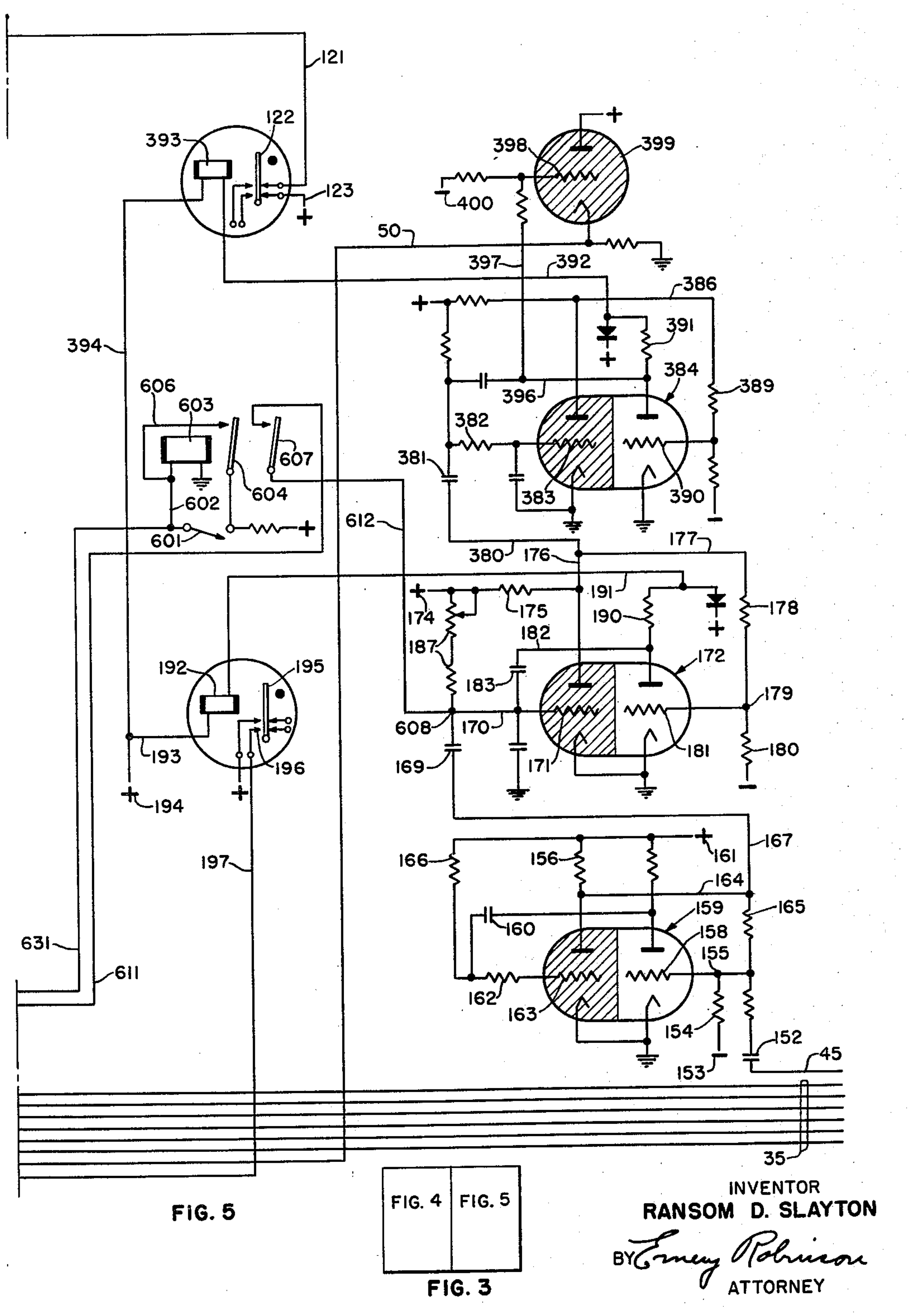
Figure 4:
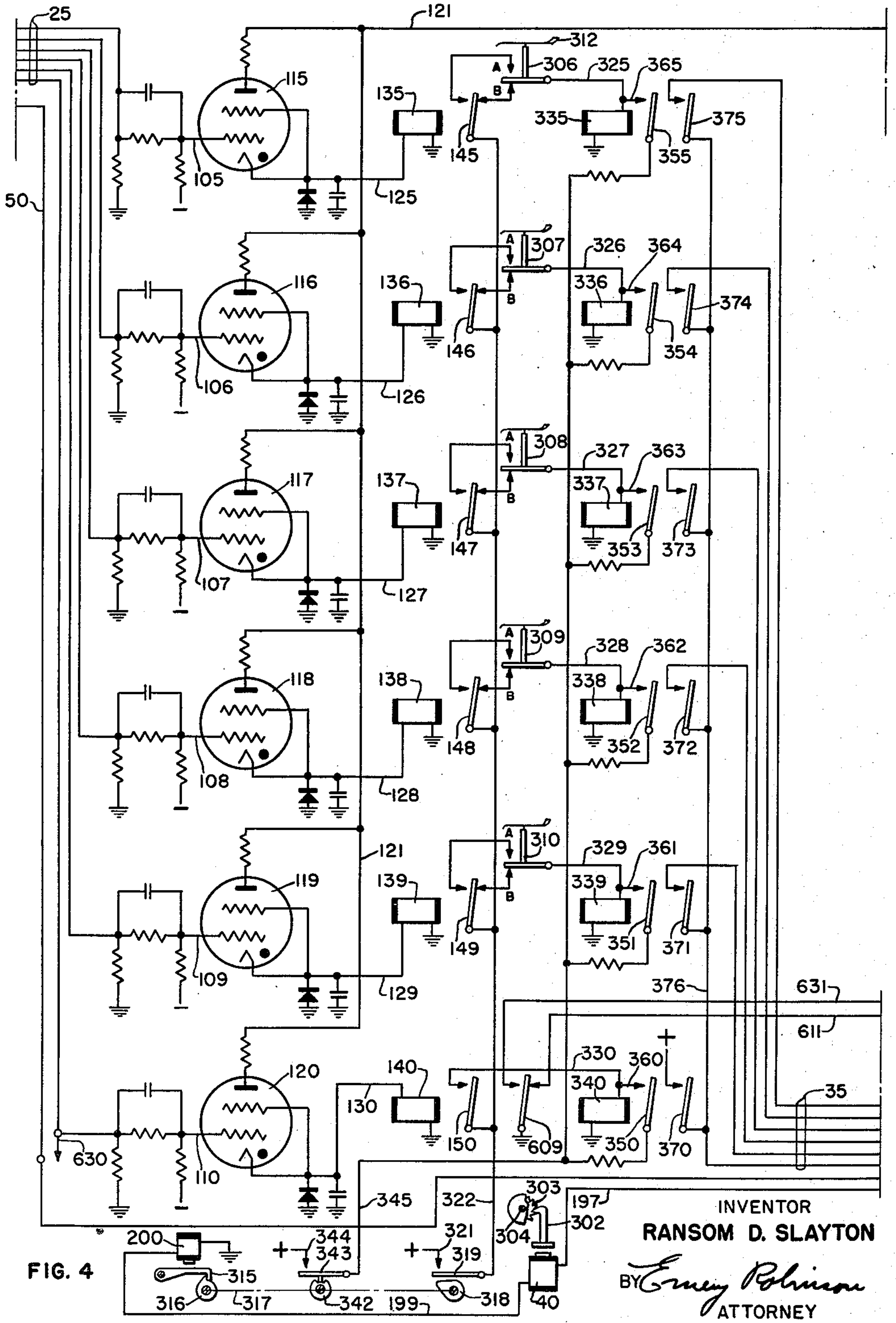
Figure 8:
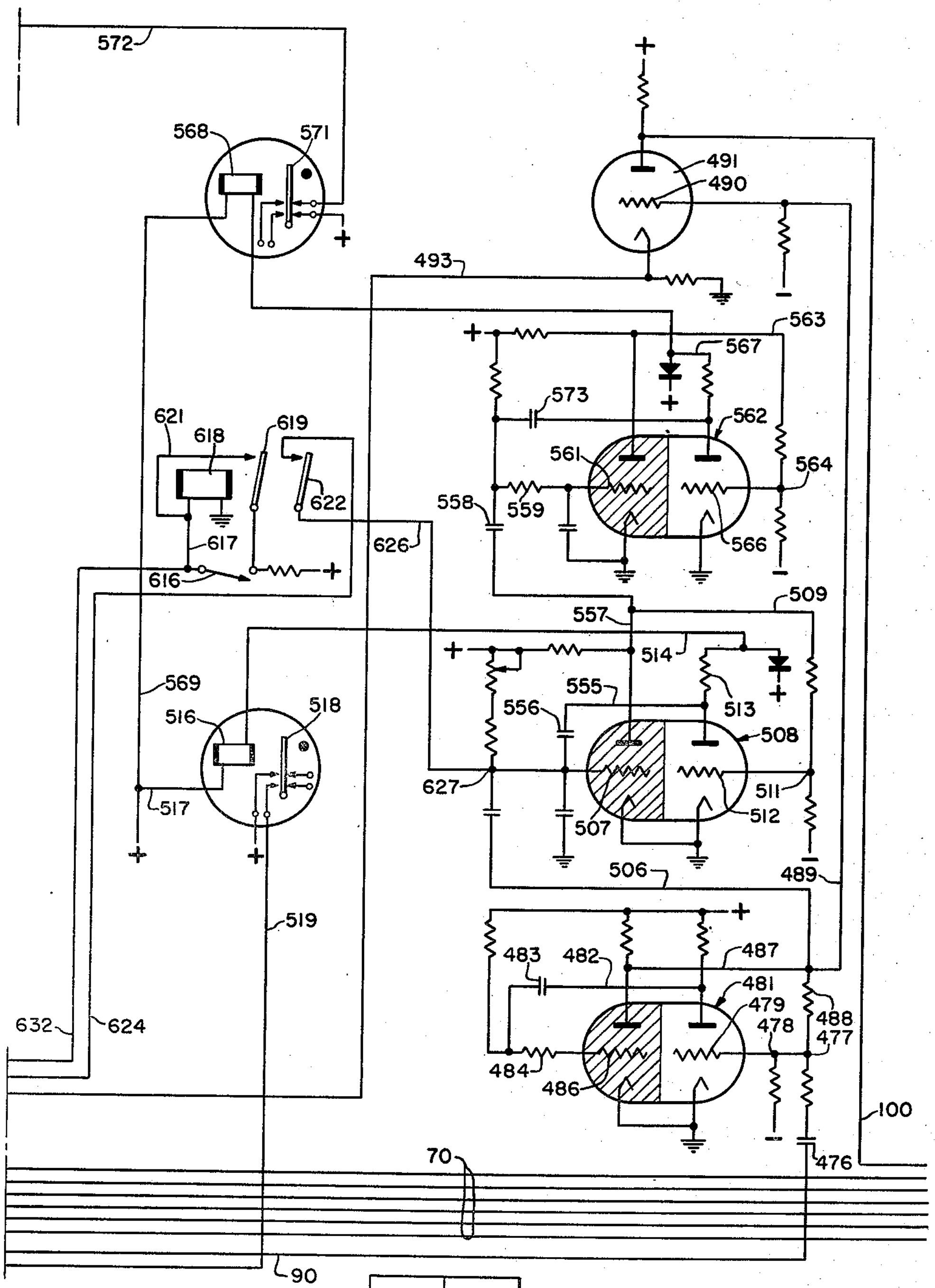
Figure 6:
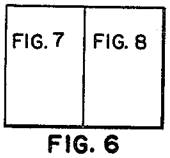
Figure 7:
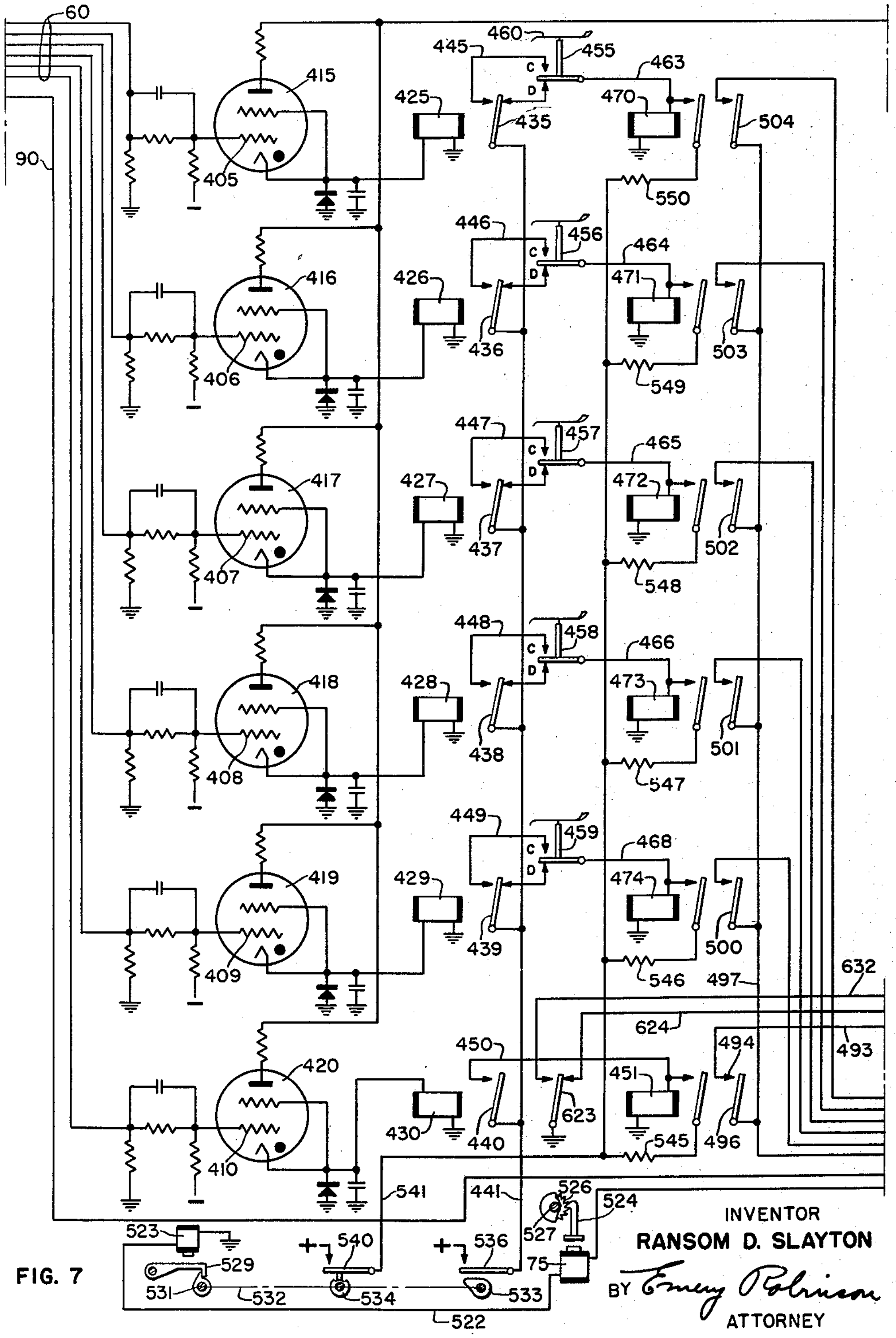

Figs. 4 and 5 when arranged as prescribed in Fig. 3 show the elements of an enciphering means located at the transmitting station;

Fig. 6 is a block diagram showing the manner in which Figs. 7 and 8 are arranged to show the elements of a deciphering circuit; and Figs. 7 and 8 when arranged as prescribed in Fig. 6 show, in detail, a deciphering means located at the receiving station.

Figure 1:
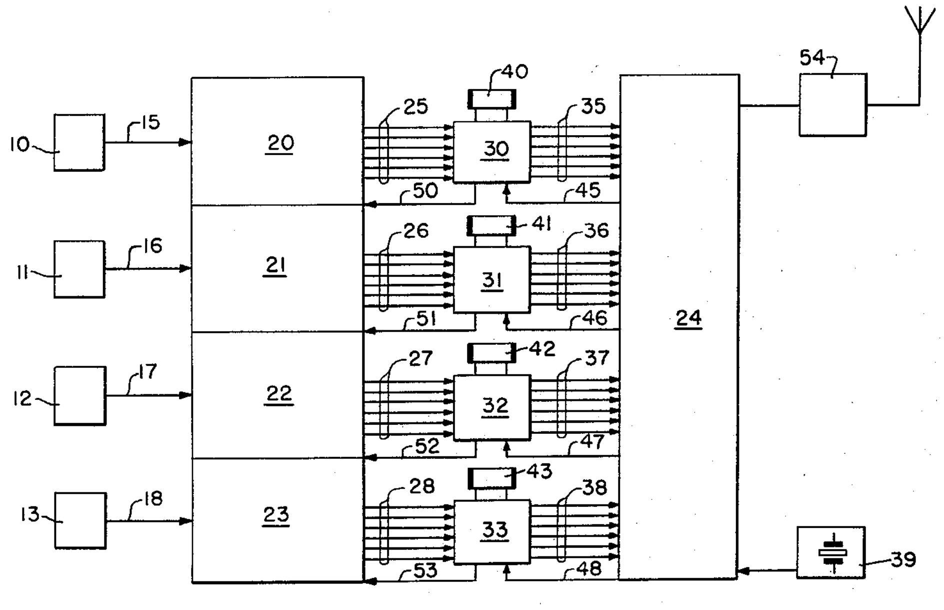
Fig. 1 is a diagrammatic drawing of the principal components of a transmitting station embodying a portion of the present invention.

Referring to the drawings and more particularly to the block diagram of Fig. 1, there is shown a multiplex transmitting system comprising a number of component units for generating, enciphering and transmitting telegraph signals. More specifically, four start-stop signal generators 10, 11, 12 and 13 are shown and are of any of the well known types, such as tape controlled transmitters, keyboard transmitters, etc. Intelligence signals generated by these signal generators are of the well known start-stop Baudot code type and are conducted over leads 15, 16, 17 and 18, respectively, to start-stop to multiplex signal converters 20, 21, 22 and 23 which may be of the type shown in the afore-identified patent to R. D. Slayton No. 2,582,218. As described in this Slayton patent the converter completes several operations; namely, the start and stop portions of each signal are eliminated; a sixth pulse is added to each separate intelligence signal; and, finally, the signals are stored in five gaseous electronic tubes preparatory to transfer to an electronic distributor 24 for ultimate transmission. In the present invention, the signals are not directly transferred to the distributor 24, but rather are impressed over leads 25, 26, 27 and 28 to enciphering devices 30, 31, 32 and 33, respectively, where the intelligence portions of the signals are enciphered and then transferred over the leads 35, 36, 37 and 38, respectively, to the transmitting distributor 24. The enciphering devices only encipher the intelligence portions of each signal and consequently the sixth pulses are transferred to the distributor in an unenciphered condition. This distributor may be of the type shown in the afore-identified Hansen patent and this patent is hereby incorporated in the present description by reference. The distributor 24 is of the electronic multiplex type and, as described in the Hansen patent, is controlled by a crystal oscillator which is designated by the reference numeral 39 in Fig. 1. The enciphering devices 30, 31, 32 and 33 are each controlled by electro-magnets 40, 41, 42 and 43 which in turn are controlled by operating impulses received over leads 45, 46, 47 and 48, respectively, from the transmitting distributor 24 and these impulses occur at regular periodic intervals because the distributor is controlled by the constant frequency source. The enciphering devices employed in the present description embody the principles first set forth in the patent to G. S. Vernam No. 1,310,719 dated July 22, 1919, and, as described in that patent they are controlled by key cipher tapes.

The control impulses impressed over leads 45, 46, 47 and 48 effectuate the operation of the electromagnets 40, 41, 42 and 43 to cause the key cipher tape located in each particular enciphering device 30, 31, 32 and 33 to be advanced in one step increments to present new ciphering signals to be combined with each intelligence signal coming from the signal converters 20, 21, 22 and 23. The impulses utilized to operate the electromagnets are also impressed over leads 50, 51, 52 and 53 to the signal converters 20, 21, 22 and 23 to cause the signal converters to apply the multiplex signals stored therein to the associated enciphering devices.

Briefly summarizing the operation of the apparatus shown in Fig. 1, the multiplex distributor 24 operates under the control of the crystal oscillator 39 to successively impress operating impulses upon the leads 45, 46, 47 and 48 to cause the enciphering device 30, 31, 32 and 33 to successively transfer signals over the leads 35, 36, 37 and 38 to the distributor where the enciphered signals are applied to any suitable transmitting terminal unit such as a radio transmitter 54. Operating impulses from the multiplex distributor 24 also successively operate the electro-magnets 40, 41, 42 and 43 to advance the key cipher tapes positioned in the respective enciphering devices following each transmission over each multiplex channel. The operating impulses are further passed over the leads 50, 51, 52 and 53 to successively operate the code converters 20, 21, 22 and 23 to cause the transfer of intelligence signals over the leads 25, 26, 27 and 28, respectively, to the enciphering devices associated with the leads whenever code signals are received from the start-stop signal transmitters 10, 11, 12 and 13.

Figure 2:
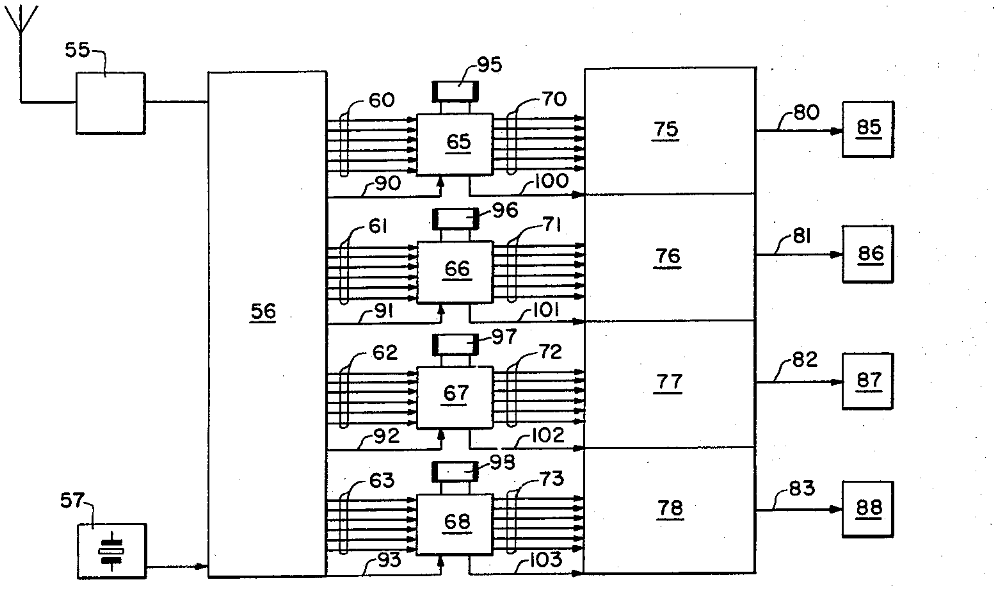
Fig. 2 is a diagrammatic drawing of the principal components of a receiving station embodying another portion of the invention.

Referring now to Fig. 2, there is shown a radio receiving device 55 for receiving the enciphered code signals from the transmitting apparatus shown in Fig. 1 and applying the enciphered signals to a receiving multiplex distributor 56 which may also be of the type shown in the afore-identified Hansen patent. As described in the Hansen patent, the receiving distributor is also controlled from a constant frequency source which in the present instance is illustrated as a crystal controlled oscillator and generally designated by the reference numeral 57. Enciphered signals received within the distributor 56 are successively applied over leads 60, 61, 62 and 63 to deciphering devices 65, 66, 67 and 68, respectively. The enciphered signals are deciphered and applied over leads 70, 71, 72 and 73 to multiplex to start-stop converter units 75, 76, 77 and 78 such as shown in the afore-mentioned patent of R. D. Slayton No. 2,536,578. The signals are transformed by the signal converters 75, 76, 77 and 78 back into the form of start-stop signals such as are originally generated by the generators 10, 11, 12 and 13 shown in Fig. 1 and are then applied over leads 80, 81, 82 and 83 to terminal recording units 85, 86, 87 and 88.

The enciphering devices 65, 66, 67 and 68 are controlled in their operation by impulses generated within the distributor 56 under the control of the crystal oscillator 57 and the impulses are successively applied over leads 90, 91, 92 and 93 to electro-magnets 95, 96, 97 and 98 to cause the operation of these magnets to effectuate the advance of a key cipher tape in each of the associated deciphering devices. The operating impulses applied over leads 90, 91, 92 and 93 are also utilized to effectuate the transfer of the deciphered signals from the associated deciphering devices over the leads 70, 71, 72 and 73 to the respective signal converters 75, 76, 77 and 78. Further, the operating impulses are applied over leads 100, 101, 102 and 103 to control the operation of the signal converters 75, 76, 77 and 78.

Referring now to Figs. 4 and 5 wherein the details are shown of the enciphering device 30 associated with one multiplex channel in Fig. 1. The leads 25 and 50 are connected to the converter 20, which is of the type shown in the Slayton Patent No. 2,582,218, by means of the plug 77 shown in Fig. 4 of this Slayton patent. The leads 35 and 45, illustrated in Figs. 1 and 5, are connected to the multiplex distributor 24, which is of the type shown in the afore-mentioned Hansen patent, by means of a plug 606 shown in Fig. 6 of the Hansen patent. It is to be understood that the enciphering devices associated with the other converters 21, 22 and 23 are identical with the enciphering device shown in the Figs. 4 and 5 and hence it is believed that a description of one will suffice for a description of all.

For the purposes of description, assume that an operating impulse has been received from the multiplex distributor 24 over the lead 45, through the enciphering device 30, and over the lead 50, and has been applied to the converter 20 to effect a transfer of a multiplex intelligence signal consisting of five intelligence impulses plus an ultra codal impulse comprising a sixth or control pulse over the leads 25 to the enciphering device 30. The multiplex signal is applied to a number of grids 105, 106, 107, 108, 109 and 110 of a number of gaseous discharge tubes 115, 116, 117, 118, 119 and 120, respectively. These gaseous discharge tubes possess the characteristic of being rendered conductive under the control of potentials applied to their respective grids, however, once the tubes are rendered conductive the grids are ineffective to quench the tubes, the control of the tubes thereupon passing to the potentials applied to either the anodes or cathodes. In the present instance the anodes of the tubes 115 to 120, inclusive, are connected over a lead 121 through an armature 122 (Fig. 5) of a relay 393, and thence over a lead 123 to positive battery. When a multiplex signal is applied over the leads 25, the tubes 115 to 119, inclusive, are rendered conductive in a permutation identical with the permutation of the intelligence portion of the multiplex signal received over the leads 25. The sixth or ultra codal pulse when received is invariably of a positive potential and is applied to the grid 110 of the tube 120 to invariably render the tube 120 conductive upon each reception of an intelligence signal. Whenever the tubes 115 to 120 are rendered conductive, they will remain in such condition until the anode circuits are opened by movement of the armature 122 to remove positive battery from the anodes.

Connected to each cathode of the tubes 115 to 120, inclusive, are a plurality of leads 125 to 130, inclusive, respectively connected to a plurality of relays 135 to 140, inclusive, and hence it may be appreciated that upon each tube becoming conductive, its associated relay is also energized to draw up its associated armatures 145 to 150, inclusive. Briefly, summarizing the results of the operation of this portion of the enciphering device it may be seen that the armatures 145 to 150, inclusive, are permutatively drawn up in accordance with the permutation of signal impulses received over the leads 25.

Considering now the circuits shown in the right-hand portion of Fig. 5, there is disclosed the leads 35 and 45 which are connected to the circuit shown in the afore-identified Hansen patent by means of a plug 606 shown in Fig. 6 of said application and as described therein operating impulses are constantly applied to the plug 606 upon completion of each transmission from the multiplex channel associated with the plug 606. This operating impulse may originate from other types of multiplex transmitting distributors such as a mechanical segment distributor having a so called local segment for originating just such impulses upon completion of transmission from each channel of the mechanical multiplex transmitting distributor. However, applicant prefers the distributor shown in the Hansen patent because of the constant frequency characteristic of the distributor, that is to say, that this distributor operating under the control of a crystal oscillator is very stable over long periods of time. The operating impulse is usually generated in the multiplex distributor immediately following the transmission of a signal from that particular channel, however, this impulse may be generated at a subsequent time because the only requirement is that the multiplex operating impulse be generated and transferred to perform its functions prior to the time that the multiplex distributor is conditioned for transmission of a subsequent signal associated with the particular channel.

The positive operating impulse received from the multiplex distributor 24 is applied to condenser 152, thereby causing the potential at a junction point 155 to rise suddenly above its normally negative value as determined by a potential divider consisting of resistors 154, 156 and 165, connected between a negative battery source 153 and a positive battery source 161. This rise in potential is reflected on a grid 158 of a one shot multivibrator tube 159. As shown in Fig. 5, the multi-vibrator tube 159 has its right-hand portion in a normally nonconducting condition due to the afore-stated negative potential at a point 155, and its left-hand portion in a normally conductive condition due to a connection between positive battery source 161 and grid 163 through resistors 162 and 166. The rise in potential on the grid 158 causes the right-hand portion of the one shot multivibrator tube 159 to initiate conduction.

Reflecting back to the initial condition of the one shot multi-vibrator tube 159, with the left-hand portion in the conductive condition, the potential drop across a condenser 160 which is connected between the junction of resistors 162 and 166 and the anode of the right-hand triode of said tube, was nearly equal to the potential of the positive source 161 because no current was flowing throught the anode resistor of said right-hand triode while the potential at grid 163 of the left-hand triode cannot rise above ground potential due to the drawing of grid current even though the positive battery 161 applied through resistors 166 and 162 is urging the grid toward a high positive potential. Resistor 162 is purposely made small compared with resistor 166 so that their junction point is only slightly positive. At the instant the right-hand portion of the tube 159 starts to conduct, due to the application of the operating impulse, the anode potential immediately decreases and since the potential between the plates of the condenser 160 cannot change abruptly, the juncture point between resistors 162 and 166 is driven from its slightly positive condition to a well negative condition. Grid 163 of the left-hand portion of the tube 159, being connected through resistor 162 to this point, is likewise driven well negative, thus cutting off the left-hand portion of the tube. Upon this portion of the tube being cut off its anode potential immediately rises. This rise in potential is imparted over a conductor 164, through resistance 165, through the juncture point 155, to the grid 158 to further increase the positive potential on the grid 158, which up to this point is all supplied by the original operating impulse. This further potential increase takes over control to maintain the grid 158 positive even after the effect of the operating impulse from the multiplex distributor is dissipated, and therefore, the right-hand portion of the one shot multi-vibrator tube 159 is retained in a conductive condition.

The condition of the one shot multi-vibrator tube 159 just described is maintained until the negative charge on the condenser 160 leaks off through resistors 162 and 166 under the influence of the positive source 161 to a value at which the potential of grid 163 rises above cut off, whereupon the left-hand portion of the tube is again rendered conductive causing its anode potential to drop. This decrease in anode potential removes the positive potential supplied to the grid 158 and, consequently, the effect of the negative source 153 is again manifested to lower the potential of the grid 158 to a value below cut off and the right-hand portion of the tube is now quenched to restore the entire tube to its initial unoperated condition. The rise in anode potential of the right triode of tube 159 is impressed through condenser 160 to the grid 163 of the left triode, instantly bringing the left triode into conduction, following which condenser 160 is rapidly recharged by grid current through the left triode and resistor 162.

When the left-hand portion of the one shot multi-vibrator tube 159 is rendered nonconductive to cause a positive potential to be impressed on the lead 164, the positive potential is also impressed on a conductor 167 connected through a condenser 169 and a lead 170 to a grid 171 of a one shot multi-vibrator tube 172. The left-hand portion of the one shot multi-vibrator tube 172, as shown, is normally in a conductive state hence the appearance of the positive potential on the grid 171 is ineffective to change the condition of the one shot multi-vibrator tube 172. However, upon the one shot multi-vibrator tube 159 being restored to the unoperated condition, the drop in potential on the anode of the left-hand portion of the tube is impressed over the conductors 164 and 167, through the condenser 169, and over the conductor 170 to the grid 171. The appearance of the negative impulse on the grid 171 causes the left-hand portion of the one shot multi-vibrator tube 172 to be rendered nonconducting. The anode potential of the left-hand portion of the tube 172 rises and a positive potential is applied from positive source 174, through a resistor 175, over a lead 176, over a lead 177, through a resistance 178, to a juncture point 179 which is normally at a negative potential from a connection to the negative battery source through a resistor 180. The appearance of the positive potential at juncture point 179, and therefore on grid 181 causes the normally nonconductive right-hand portion of the tube to be rendered conductive. Upon the right-hand portion of the tube being rendered conductive, its anode potential drops and this drop is reflected in the application of a negative potential over a conductor 182, through a coupling condenser 183, to the grid 171 of the left-hand portion of the tube 172. The left-hand portion of the tube 172, is therefore, maintained in a nonconductive state when the effect of the negative impulse from the one shot multi-vibrator tube 159 is dissipated. The left-hand portion of the tube 172 is maintained non-conductive while the negative charge in condenser 183 is being discharged through resistors 187 to positive battery source 174. When the charge has sufficiently leaked off the condenser 183, the grid 171 reaches the cut off point and again renders the left-hand portion of the tube 172 conductive, and hence the tube is returned to its normal unoperated state, with the right-hand portion rendered nonconductive.

When the right-hand portion of the tube 172 is rendered conductive, current flows through the tube, through a resistance 190, over a conductor 191, through a coil of a mercury contact relay 192, over a conductor 193 to positive battery 194. Energization of the relay coil 192 causes its armature 195 to be drawn up to complete a circuit which may be traced from positive battery, through the front contacts 196 and armature 195 associated with the relay coil 192, over a conductor 197 through the electro-magnet 40 (Fig. 4), over a conductor 199, through an electro-magnet 200 to ground.

Energization of the electro-magnet 40 draws up a feed pawl 302 adapted to cooperate with and advance a ratchet 303 attached to a shaft 304 having secured thereto a feed wheel of a tape sensing device (not shown) but diagrammatically represented in Fig. 4 by five sensing levers 306, 307, 308, 309 and 310. The tape sensing levers 306 to 310, inclusive, sense the permutation of apertures in a key cipher tape 312 and position contact elements connected thereto in engagement with either of a pair of contacts A or B associated with each contact element. If the sensing levers ascertain the presence of perforations in the tape, the contact elements are moved up into engagement with the contacts designated by the letter A. If, however, the sensing levers do not ascertain the presence of perforations, the contact elements are positioned in engagement with the contacts designated by the letter B.

It is to be recalled that if the signals from the converter 20 are received over the leads 25, then the relays 135 to 140, inclusive, are positioned accordingly and that the contacts 145 to 149, inclusive, are permutatively positioned in accordance with the intelligence portion of the signal coming from the converter 20. When the electro-magnet 200 is energized a clutch trip latch 315 is drawn up to release a clutch 316 whereupon a shaft 317 is permitted to make one revolution under the influence of any suitable source of rotative power (not shown). Attached to the shaft 317 is a cam element 318 adapted to move a cam follower 319 up into engagement with a contact element 321. Closure of this contact, conditions a circuit from positive battery through the contact element 321, through the cam follower 319, over a lead 322, to the armature 145 to 150, inclusive. Circuits will, therefore, be completed from the lead 322, through those armatures 145 to 150 which are drawn up, through the contacts A, over leads 325 to 330, inclusive, then through a group of relays 335 to 340, inclusive, and from there to ground. Circuits are also completed from the energized lead 322 when the armatures 145 to 149, inclusive, are positioned against the back contacts associated with each one of these armatures, through the contacts B, and over the leads 325 to 329, inclusive. Whenever a situation exists where any of the relays 135 to 139 are not energized and the sensing levers 306 to 310, inclusive, ascertain the presence of apertures in the key cipher tape 312, the afore-described circuits are not completed. Likewise, the circuits are not completed when the relays 135 to 139, inclusive, are energized and the sensing levers 306 to 310, inclusive, do not ascertain the presence of perforations in the key cipher tape 312. It will be recognized that this manner of enciphering signals is substantially identical with the method set forth in the above-identified Vernam patent.

Secured to the shaft 317 is a second cam 342 adapted to move a follower 343 into engagement with contact element 344 to complete a circuit from positive battery which may be traced through the contact 344, through the cam follower 343, over a lead 345, through a number of armatures 350 to 355, inclusive, and the front contacts 360 to 365, inclusive, to complete locking circuits for the energized ones of the relays 335 to 340, inclusive. Upon a permutation of the relays 335 to 340 becoming energized, their front armatures 370 to 375 are permutatively drawn up. The drawing up of the armature 370 associated with the relay 340 connects positive battery to a lead 376 which in turn, is connected to each of the armatures 371 to 375, inclusive, associated with the other relays 335 to 339, inclusive; therefore, the permutation of relays 335 to 339, which are energized, draw up the armatures 371 to 375 associated therewith to allow positive battery to be imparted through the armature 370, over the lead 376 and through the associated permutation of drawn up armatures 371 to 375, inclusive, and from there to the leads 35 which are connected to the plug 606 shown in Fig. 6 of the Hansen patent.

It now becomes apparent that the transfer of any signal, whether enciphered or not, from the circuits shown in Fig. 4 is dependent upon the relay 340 becoming energized. Consequently, if a signal comes from the converter 20 and is not accompanied by a sixth or ultra codal control pulse, the relay 340 will not be energized and as a result positive battery will not be supplied to the armatures 370 to 375, inclusive, to effectuate the transfer of a signal over the leads 35.

As described in the above-identified Hansen patent the multiplex distributor periodically and invariably supplies operating impulses over the lead 45 and as a result the electro-magnet 40 is invariably actuated to continuously step the key cipher tape 312 in one step increments regardless of the fact that no intelligence signals are being fed into the system. The key cipher tape 312 steps along to position the sensing levers 306 to 310, inclusive, in accordance with the permutations of perforations therein and as a result the contact elements associated therewith are either positioned in engagement with contacts A or B to cause the permutative energization of the relays 335 to 339, inclusive, in accordance with the permutations of perforations in the key cipher tape 312. The permutative energization of the relays 335 to 339, inclusive, causes a permutation of the associated armatures 351 to 355, inclusive, and 370 to 375, inclusive, to be drawn up. However, under conditions described in the preceding paragraph, no signals are transferred to the leads 35 because positive battery is not applied to the armatures 371 to 375, inclusive, due to the fact that positive battery must pass through the armature 370 and the armature 370 is not closed when the sixth pulse from the converter 20 is not received by the enciphering apparatus.

Returning to a consideration of the circuits shown in Fig. 5 and more particularly to a consideration of the events that occur subsequent to the restoration of the one shot multi-vibrator 172 to the initial unoperated condition, upon the left-hand portion of the tube 172 becoming conducting, its anode potential drops whereupon a negative potential transition is imparted over the lead 176, over a lead 380, through a coupling condenser 381, through a resistance 382, to a grid 383 of a one shot multi-vibrator tube 384. The potential of the grid 383 is reduced below the cut off value to render the left-hand portion of the tube 384 nonconducting. Upon the left-hand portion of the tube becoming nonconducting its anode potential rises whereupon positive potential is applied over lead 386 through a resistance 389 to a normally negatively biased grid 390. The appearance of this positive potential on the grid 390 renders the right-hand portion of the tube 384 conductive whereupon a circuit is completed through the tube, through a resistance 391, over a lead 392, through the coil of a mercury contact relay 393, over a lead 394 to the source of positive battery 194. Energization of the mercury relay coil 393 causes its armature 122 to be drawn up to break the circuit from positive battery over the lead 121 to the anodes of the gaseous discharge tubes 115 to 120, to remove positive potential therefrom. Removal of positive potential from the anodes of these gaseous discharge tubes obviously renders them nonconductive and upon reclosure of the armature 122 places the tubes in the condition to receive subsequent signals from the converter 20.

When the right-hand portion of the tube 384 becomes conductive, its anode potential drops, therefore, impressing a reduced potential over leads 396 and 397, to a grid 398 of a normally conductive vacuum tube 399. The reduction of potential on the grid 398 causes the tube 399 to be rendered nonconductive. The cathode potential of the tube 399 thereupon drops to apply a negative impulse over the lead 50. This negative impulse is applied through a plug 77 shown in Fig. 4 of the Slayton Patent No. 2,582,218 where it has no effect. However, the transition of the negative impulse to positive potential which occurs when the tube 399 is restored to the conductive state, is utilized to release the signal storing means therein so that the next succeeding signal may then be applied over leads 25 to control the gaseous discharge tubes 115 to 120 shown in Fig. 4.

Recapitulating on the operation of the enciphering circuits shown in Figs. 4 and 5, signals are received over leads 25 to permutatively operate the gaseous discharge tubes 115 to 120 which in turn energize the relays 135 to 140 in accordance with the incoming signals. The operating impulse is received over lead 45 from the multiplex distributor 24 and passes through the one shot multi-vibrator tube 159 to supply an impulse for the operation of the one shot multi-vibrator tube 172. Energization of the right-hand portion of the tube 172 completes an energizing circuit for the relay 192. Relay 192 draws up its armature 195 to complete energizing circuits for the electro-magnets 40 and 200. Electromagnet 40 draws up pawl 302 to cause the tape 312 to advance one increment, and immediately thereafter cam 318 moves its follower 319 to complete circuits for the permutative energization of the relays 335 to 340. These relays are energized in accordance with the enciphered signal as determined by the combined effect of the energization of the relays 135 to 140 and the positions assumed by the tape sensing levers 306 to 310. Shortly thereafter the cam 342 moves the cam follower 343 into engagement with the contact 344 to complete locking circuits for the relays 335 to 340 which are energized.

Upon the tube 172 being restored to its initial condition, the operating impulse is impressed over lead 380 to operate the one shot multi-vibrator 384. Upon the right-hand portion of the tube 384 being rendered conductive a circuit is completed for the operation of the relay 393. Energization of the relay 393 draws up the armature 122 to momentarily break the circuits normally connected between positive battery and the anodes of the gaseous discharge tubes 115 to 120 and hence restores these tubes to a condition whereby the next signal may be applied to the tubes. Upon the one shot multi-vibrator 384 being restored to its initial unoperated condition, an impulse is impressed on the grid 398 to the tube 399 to cause this tube to become conductive. When tube 399 is rendered conductive, a rise in potential occurs in its cathode circuit which potential is impressed over lead 50 to the converter 20 to cause the next set of signals stored therein to be transferred over the leads 25 to operate the gaseous discharge tubes 115 to 120.

Turning now to a consideration of the deciphering circuits shown in Figs. 7 and 8, a signal comprising five enciphered intelligence impulses plus a sixth pulse is received by the multiplex distributor 56 (Fig. 2) and is applied over the leads 60 to grids 405 to 410, inclusive, to permutatively energize a number of gaseous discharge tubes 415 to 420. In utilization of a multiplex receiving distriubtor such as shown in the afore-identified patent to T. A. Hansen, the leads 60 will be connected to a plug 2003 shown in Fig. 20 of the Hansen patent. The tubes 415 to 420 possess characteristics of being initiated into operation by a positive potential being applied to the respective grids, however, once a tube is energized it will remain so until such time as its cathode or anode potential is changed. The tube 420 is energized upon each reception of a complete signal including a sixth pulse which is invariably a positive or marking impulse. The energized ones of the tubes 415 to 420, inclusive, complete obvious circuits to energize a permutation of relays 425 to 430, inclusive, in accordance with the permutation of tubes energized. Energization of any of the relays 425 to 430 effectuates the drawing up of their respective armatures 435 to 440, inclusive. The drawing up of these armatures conditions circuits from a lead 441 through respective armatures and leads 445 to 450, inclusive, to contact points C and to a relay 451 associated with the lead 450. The contacts C are associated with contact elements attached to a plurality of sensing levers 455 to 459 adapted to sense a permutation of perforations in a key cipher tape 460 which has an identical sequence of permutative perforations therein as was formed in the key cipher tape 312 located at the transmission station shown in Fig. 4. The sensing levers are adapted to close contacts C whenever a perforation is sensed by the respective sensing lever, however, when no perforations are ascertained in the key cipher tape 461 then the sensing levers maintain the contact elements associated therewith in engagement with contacts D.

It will be recognized that this manner of deciphering enciphered signals is substantially in accordance with the principles set forth in the afore-identified Vernam patent, that is, whenever an armature 435 to 439 is drawn up and associated sensing levers 435 to 439 ascertain the presence of perforations in a key cipher tape 461, circuits will be conditioned leading over leads 463 to 468 and through a plurality of relays 470 to 474. Whenever any of the relays 425 to 429 are not energized and the associated sensing levers 455 to 459 do not ascertain the presence of perforations in the key cipher tape 460 then circuits are again conditioned over lead 441, through the armatures 435 to 439, through the contact elements D over the leads 463 to 468, and through the relays 470 to 474 to ground. Obviously if the armatures 435 to 439 are drawn up and the associated sensing levers 455 to 459 do not ascertain the presence of perforations in the key cipher tape 460 then these afore-described circuits are not conditioned. Similarly, if the armatures 435 to 439 are not drawn up and the sensing levers 455 to 459 do ascertain the presence of perforations in the key cipher tape 460 then these circuits are again not conditioned.

Subsequent to the reception of each signal over the leads 60, a multiplex operating impulse is supplied by the multiplex distributor over a lead 90, through a condenser 476, through a junction point 477, through a juncture point 478, to a grid 479, of a one shot multivibrator tube 481. Upon reception of the positive impulse on the grid 479, the right-hand portion of the tube 481 is rendered conductive and as a result the anode potential drops. This decrease in anode potential is impressed over a lead 482, through a coupling condenser 483, through a small resistance 484 to a grid 486, of the left-hand portion of the tube 481. The appearance of the decreased potential on the grid 486 causes the left-hand portion of the tube to be rendered nonconducting. The anode potential of the left-hand portion of the tube instantly rises and is impressed over a lead 487, through a resistance 488, to the juncture point 477, thereby applying a positive potential to the grid 479 to maintain the right-hand portion of the tube conductive. The increased potential impressed over the lead 487 is also impressed over a lead 489 to a grid 490 of a vacuum tube 491. The vacuum tube 491 is rendered conductive and the anode potential drops to impart a negative pulse over the lead 100 connected to the anode of the tube 491. The lead 100 together with the leads 70 are connected to a plug 11 shown in Fig. 4 of the patent to R. D. Slayton No. 2,536,578. The aforementioned negative pulse applied at this time over the lead 100 has no effect at the associated multiplex to start-stop code converter 75. The left-hand portion of the tube 481 remains nonconductive until the charge leaks off the coupling condenser 483 whereupon the left-hand portion of the tube 481 is rendered conductive. Upon the left-hand portion of the tube becoming conductive, the anode potential decreases and this decreased potential is applied over leads 487 and 489 to quench the vacuum tube 491. The decrease in potential is also impressed through the resistance 488, juncture points 477 and 478, to the grid 479 to restore the one shot multi-vibrator tube 481 to its initial condition. When the vacuum tube 491 is quenched, its anode potential instantly rises and this transition is impressed over the lead 100 to the multiplex to start-stop converter 75 to cause retransmission of the previously received code permutation in start-stop form and to then condition storage means contained therein for the reception of a subsequent signal over the leads 70.

Prior to this, upon the vacuum tube 491 becoming conductive, its cathode potential rises and this increased cathode potential is impressed over a lead 493 to a front contact 494 associated with the relay 451. If a permutation of relays 470 to 474 are energized, then positive battery passes through the contact 494, through the front armature 496 of the relay 451, over a lead 497, and through those armatures 500 to 504 which are drawn up by the permutation of energized relays 470 to 474, and over the associated leads 70 to the multiplex to start-stop converter 75 whereby the storage means therein are accordingly operated.

Returning now to a consideration of the events occurring when the one shot multi-vibrator 481 is restored to its initial condition; the anode potential of the left-hand portion of the tube 481 drops and the decreased anode potential is imparted over the lead 487, over a lead 506, through a condenser to a grid 507 of a second one shot multi-vibrator tube 508. The left-hand portion of the tube is rendered nonconductive and its anode potential rises to impress an increased potential over a lead 509, through a resistor to a juncture point 511, to a grid 512 of the right-hand portion of the tube 508. The appearance of increased potential on the grid 512 renders the right-hand portion of the tube conductive to complete a circuit which may be traced through the tube 508, through a resistance 513, over a lead 514, through a mercury contact type relay coil 516, over a lead 517, to positive battery. Energization of the relay coil 516 causes its armature 518 to be drawn up to complete a circuit from positive battery, through the armature 518, over a lead 519, through the electro-magnet 75, over a lead 522, through a second electro-magnet 523 to ground. Energization of the electro-magnet 75 causes a ratchet pawl 524 to be drawn up to advance a ratchet 526. The ratchet 526 is attached to a shaft 527 having secured thereon a feed wheel for advancing the key cipher tape 460.

Energization of the electro-magnet 523 effectuates the withdrawal of a trip latch 529 from a clutch 531 to permit the clutch to make one revolution. The clutch is driven from a suitable rotative source and upon release imparts movement to shaft 532 to rotate cams 533 and 534. The period of rotation of the shaft is selected to be slightly less than the frequency of operating pulses appearing in the lead 90. Cam 533 closes a contact 536 to connect positive battery to the lead 441, and as previously described, the lead 441 forms an integral portion of the conditioning circuits which are connected through the armatures 435 to 440 to the relays 470 to 474 and 451. This closure of the contact 536, therefore, energizes a permutation of the relays 470 to 474 in accordance with the combined effect of the energized ones of the relays 425 to 430 and the position of the sensing levers 455 to 459. This operation effects a decipherment of the enciphered signal and a permutation of relays 470 to 474 are energized in an identical manner as were the relays 135 to 139 shown in Fig. 4 which as previously described is in accordance with the original unenciphered signal. Immediately after the follower 536 is closed, a follower 450 is moved by cam 534 to complete a circuit which may be traced from positive battery over a lead 541, through the resistors 545 to 550, a front armature associated with each relay 470 to 474 and relay 451, through the associated relay to ground to complete locking circuits for these relays. This locking circuit is maintained until the low portion of the cam 534 is presented to the follower contact 540 which occurs shortly after the one shot multi-vibrator 481 is again operated by a subsequent pulse received over the lead 90.

It is to be remembered that upon reception of each complete enciphered signal a sixth impulse is also received, therefore, the relays 430 and 451 are always energized to indicate the reception of a complete signal. It may be, therefore, appreciated that unless the relay 451 is energized, positive battery cannot be applied to the lead 497 and hence to the leads 70 extending to the multiplex to start-stop converter or other terminal equipment and as a result spurious or meaningless operation of such terminal equipment is precluded when a sixth impulse is not received with each signal. This condition occurs whenever no transmission is taking place over the channel associated with this particular deciphering apparatus.

Returning again to a consideration of the one shot multi-vibrator 508, the drop in potential associated with the right-hand portion of the tube becoming conductive is impressed over a lead 555, through a coupling condenser 556, to the grid 507 to maintain the left-hand portion of the tube 508 in a nonconductive state. The left-hand portion of the tube 508 remains nonconductive until the negative charge leaks off the condenser 556 whereupon the left-hand portion of the tube is again rendered conducting. Upon the left-hand portion of the tube being restored to a conductive state, its anode potential drops to impart a negative potential over a lead 557, through a condenser 558, over a lead 559, to a grid 561, of a one shot multi-vibrator tube 562. Appearance of the negative potential on the grid 561 renders the left-hand portion of the tube 562 nonconductive. Upon the left-hand portion of the tube becoming nonconductive, its anode potential rises to impress a positive potential over a lead 563, through a juncture point 564, to a grid 566 in the right-hand portion of the tube 562. The appearance of this increased potential on the grid 566 renders the right-hand portion of the tube conductive to complete a circuit which may be traced through the tube over a lead 567, through the coil of a mercury relay 568, over a lead 569, to positive battery. Energization of the mercury relay coil 568 draws up its armature 571 to break a circuit which was previously traced from positive battery through the armature 571, over a lead 572 to the respective anodes of the gaseous discharge devices 415 to 420, inclusive. Upon the anode circuits of the tubes 415 to 420 being broken, these tubes are quenched to condition them for the subsequent reception of additional enciphered signals over the leads 60. The one shot multivibrator 562 is restored to its initial condition upon the negative charge leaking off of the coupling condenser 573 which had supplied the grid 561 with a negative charge.

A recapitulation will now be given of the deciphering circuits shown in Figs. 7 and 8. Enciphered signals are received from the multiplex distributor 56 over the leads 60 and are impressed on the grids 405 to 410 of the gaseous discharge tubes 415 to 420. These tubes are thereupon energized in accordance with the incoming signals and those tubes, which are operated, complete energizing circuits for a selection of relays 425 to 430. Immediately following the reception of the signal, an operating impulse is applied over lead 90 to the one shot multi-vibrator tube 481. The one shot multi-vibrator tube 481 operates and upon restoration to its initial unoperated condition an impulse is impressed over lead 506 to effectuate the operation of the one shot multi-vibrator tube 508. Upon the right-hand portion of the tube 508 becoming conductive, a circuit is completed for the operation of the relay 516. Energization of relay 516 causes its armature 518 to be drawn up to complete a circuit for the operation of the electro-magnets 75 and 523. Electro-magnet 75 draws up the pawl 524 to actuate the tape advancing means to cause the tape 460 to step forward one increment. Immediately thereafter, the cam 533 closes the contact follower 536 to complete circuits for the permutative energization of the relays 470 to 474 and 451. Inasmuch as the permutations contained in the tape 460 are identical with the permutations in the tape 312 the net result is that the relays 470 to 474 and 451 are energized in accordance with the signals originally fed into the system from the converter 20. Immediately following the energization of the relays 470 to 474 and 451, the cam 534 moves the cam follower 540 to complete locking circuits for the relays, which circuits are maintained until the one shot multi-vibrator 481 is again operated by the reception of another pulse over the lead 90.

When the one shot multi-vibrator 508 is restored to its original unoperated condition, an impulse is impressed over the lead 557 to the grid 561 to cause the multi-vibrator tube 562 to operate. When the right-hand portion of the tube 562 is rendered conductive, the circuit is completed for the energization of the relay 568. Energization of the relay 568 draws up its armature 571 to momentarily break the circuit which supplied positive battery to the anodes of the gaseous discharge tubes 415 to 420. The tubes 415 to 420 following restoration of positive battery to the anodes, are now in condition for the reception of the next enciphered signal over the lead 60. Following the reception of the second group of enciphered signals, a second operating impulse is received over the lead 90 to cause the multi-vibrator tube 481 to again operate. When the left-hand portion of the tube 481 is rendered conductive, positive battery is impressed over the lead 489 to the vacuum tube 491 to cause this tube to be rendered conductive. Upon this tube becoming conductive, a circuit is completed from the tube 491 over the lead 493 to the contact 494 through the armature 496 (now drawn up) through that permutation of armatures 500 to 504 which are drawn up and from there over the leads 70 to the converter 75, whereupon the storage means in the converter are energized in accordance with the deciphered signal. When the tube 491 becomes conductive, its anode potential dropped and this drop in potential was imparted over the lead 100 to the converter 75, but is ineffective to cause the operation of the converter at this time. Upon the tube 491 being restored to its nonconductive state, the potential applied over the lead 100 immediately rises and this rise in potential is utilized to initiate the operation of the converter 75. Shortly after the operation of the tube 491 to the conductive state, the cam 534 which is still rotating on its previously initiated cycle, presents its low portion to the follower 540 to open the locking circuits for the relays 470 to 474 and 451 to again condition these relays for the reception of the signal now stored in relays 425 to 430. It may be seen that during the normal operation of the circuits shown in Figs. 7 and 8 there is a time when two signals are stored in the circuits; namely, an enciphered signal in the relays 425 to 430 and second, a deciphered signal stored in the relay 470 to 474 and 451.

Further, it is to be noted that the cam 534 holds the locking circuits closed for the relays 470 to 474 and 451 until after the tube 491 operates to transfer the setting of these relays to the storage means contained in the multiplex to start-stop converter 74; and, that before the tubes 481 and 491 are restored to their initial unoperated condition, the contact 540 is opened to release the locking circuits. Immediately after restoration of the tubes 481 and 491 to the unoperated condition, the tube 508 operates and the contact 536 is accordingly closed to re-energize the relays 470 to 474 and 451 in conformity with the new deciphered signal conditionally set up in the leads 463 to 468 and 450.

Consideration will now be given to the method and circuits utilized to place the tape advancing means located at the transmitting station in synchronism with the tape advancing means at the receiving station. Inasmuch as the key cipher tape 312 located in the transmitting station and the key cipher tape 460 located at the receiving station are each perforated with an identical random series of permutative signals, it becomes apparent that the tapes 312 and 460 must be placed in their respective tape sensing devices and be adapted to be advanced to sense the first permutation therein at the same time. When a transmitting station desires to commence transmission, it will inform the receiving station by any suitable communication that transmission of enciphered messages are to commence at some predetermined time.

Prior to the insertion of the key cipher tape 312 at the apparatus shown in Fig. 4, the enciphering circuits are conditioned for the reception of the tape by first closing a switch 601 shown in Fig. 5 to complete a circuit from positive battery through the switch 601, over a lead 602, through a relay 603 to ground. Energization of the relay 603 draws up its front armature 604 to complete a locking circuit which may be traced from positive battery through the armature 604, over a lead 606, through the relay 603, to ground. Energization of the relay 603 draws up its back armature 607 to complete a ground connection to a juncture point 608 which may be traced from ground through a back armature 609 associated with the de-energized relay 140 (shown in Fig. 4), over a lead 611, through the now drawn up armature 607, over a lead 612, to the juncture point 608. The switch 601 is now opened but the relay 603 is maintained energized through its locking circuit associated with the front armature 604.

The application of ground potential to the juncture point 608 prevents the multiplex operating impulses which are invariably and periodically impressed over the lead 45 and which energize the multi-vibrator tube 159, from ever reaching the grid 171 of the one shot multi-vibrator tube 172 at the time tube 159 is restored to its normal condition. When ground is connected to the juncture point 608, negative impulses received over the lead 167 merely pass over the ground circuit previously described. Failure of the impulse to operate the one shot multi-vibrator 172 causes the tube to remain in the condition shown in Fig. 5 and as a consequence the right-hand portion of the tube is never energized to complete a circuit for operating the mercury relay 192. It is to be remembered that as previously described the mercury relay 192 controls the energizing circuits for the electro-magnets 40 and 200, and that the electro-magnet 40 controls the advance of the key cipher tape 312 through the enciphering apparatus. The key cipher tape 312 can now be placed over the sensing levers 306 to 310 so that these sensing levers sense the first series of permutative perforations in the tape.

Failure of the one shot multi-vibrator 172 to operate when the juncture point 608 is grounded also prevents the operation of the one shot multi-vibrator tube 384 and the failure of the one shot multi-vibrator tube 384 to operate causes the vacuum tube 399 to remain in a conductive state as shown in Fig. 5. When the vacuum tube 399 remains in a conductive state, no operating impulses can be passed over the lead 50 to the start-stop to multiplex converter 20 to effectuate the transfer of a signal stored therein to the storage tubes 115 to 120 located in the enciphering device.

Attention is now directed to Figs. 7 and 8 for a consideration of the preliminary steps which must be taken prior to the reception of any enciphered messages for decipherment. When the receiving station has been informed that messages are to be transmitted at an agreed predetermined time, the receiving station will, prior to this time, condition the receiving apparatus for reception of the enciphered signals. This conditioning of the apparatus must include the positionment of the key cipher tape 460 so that the sensing levers 455 to 459 sense the first series of permutations of perforations in the tape at the same time that the sensing levers 306 to 310 are sensing the first series of permutative perforations in the tape 312.

The deciphering apparatus is conditioned by first closing a switch 616 shown in Fig. 8 to complete a circuit which may be traced from positive battery through the switch 616, over a lead 617, through a relay 618, to ground. Energization of the relay 618 draws up its front armature 619 to complete a locking circuit which may be traced from positive battery through the armature 619, over a lead 621, through the relay 618, to ground. Upon completion of the locking circuit, the switch 616 is then opened. Energization of the relay 618 also causes its back armature 622 to be drawn up to complete a circuit which may be traced from grounded back armature 623 of the relay 430 shown in Fig. 7, over a lead 624, through the now drawn up armature 622, over a lead 626, to a juncture point 627. Upon a ground circuit being connected to the juncture point 627, any operating impulses coming over the lead 506 are grounded out to prevent the one shot multi-vibrator tube 508 from operating. Failure of the one shot multi-vibrator tube 508 to operate prevents the completion of a circuit for the operation of the mercury relay 516. It is to be recalled at this time, that the mercury relay 516 controls the armature 518 which in turn controls the energization of the electro-magnets 75 and 523. Failure of the electro-magnets 75 to operate prevents the tape advancing means from being actuated, hence the insertion of the key cipher tape may be made at this time without any danger of the tape advancing means advancing the tape prior to the reception of the first enciphered signal. The multiplex operating impulse applied over lead 90 actuates the one shot multi-vibrator tube to apply positive impulse over the lead 489 to operate the vacuum tube 491 thereby applying pulses over the lead 100 to continue to clear the storage tubes in the multiplex to start-stop converter for the reception of the first deciphered message signals.

The system is now in condition for the initiation of the transmission of enciphered signals. In order to start the system in operation, a switch 630 (Fig. 4) is closed to apply the cathode potential of the vacuum tube 399 (Fig. 5) over the lead 50, through the switch 630, to the grid 110 of the sixth pulse gaseous discharge tube 120. The tube 120 is, thereupon, rendered conductive to energize the solenoid 140 over a lead 130. Energization of the solenoid 140 draws up its back armature 609 to remove ground from the juncture point 608. Movement of the armature 609 against its front contact applies ground over a lead 631 to the lead 602. The appearance of ground on the lead 602 acts to short circuit the locking circuit for the relay 603 which, thereupon, deenergizes to open its armature 604 to break the locking circuit. The front armature 607 is also released to again break the ground circuit to the juncture point 608. When the next multiplex operating impulse is impressed over the leads 45, the one shot multi-vibrators 159, 172 and 384 are operated so that the normal function associated with the operation of these tubes are now performed. That is to say the key cipher tape 312 is advanced one step, the mercury type relay 393 is energized to break the anode circuits of the gaseous discharge devices 115 to 120 to render them nonconductive and the tube 399 is cut off to apply an operating impulse over the lead 50 to the start-stop to multiplex converter to set the converter in operation to transfer the first signal to the enciphering apparatus. The first signal transmitted by the transmitting apparatus will consist of a sixth pulse plus five signal impulses representative of the first series of permutative perforations in the enciphering tape 312.

Reception of the sixth or ultra code pulse by the receiving apparatus causes a positive potential to be applied over the lead 60 to operate the gaseous discharge tube 420 and operation of this tube causes the relay 430 to be energized. Energization of the relay 430 draws up its back armature 623 to apply ground through the armature 623, over a lead 632, to the lead 617. Appearance of ground on lead 617 causes the relay 618 to be in effect short circuited, whereupon the relay 618 is de-energized to release its front armature 619 to break the locking circuit for the relay 618. The armature 622 also falls away from its contact to remove ground from juncture point 627. Removal of ground from juncture point 627 allows the multiplex operating impulse to pass through the one shot multi-vibrator 481 and also allows a negative pulse to pass over the lead 506 to the grid 507 of the one shot multi-vibrator tube 508. This causes the operation of the one shot multi-vibrator tube 508 and as a result the relay 516 is energized and, as previously described, energization of the relay 516 effectuates the operation of the electro-magnets 75 and 523. Operation of the electro-magnet 75 causes the tape advancing means to function to advance the key cipher tape one increment. It may be therefore understood that the applied signal which is representative of the permutations contained in the key cipher tape 312 is deciphered by the first series of permutations contained in the key cipher tape 460. Inasmuch as the perforations in both the tapes 312 and 460 are identical in nature, the net result is that a blank signal is transferred over the lead 70 to the multiplex to start-stop converter. Upon reception of each subsequent message signal over the leads 25, the signals are enciphered by the circuits shown in Figs. 4 and 5 and are deciphered by the circuits shown in Figs. 7 and 8 in a manner set forth in the previous discussion of these figures. The system will now operate on a continuous basis, until at some predetermined time mutually acceptable to the transmitting and receiving terminals, the switches 601 and 616 are again operated in anticipation of an interruption of operations with a subsequent resumption upon the operation of switch 630 at the transmitting station.

It is to be understood that the above described methods, arrangements of circuits, elements and apparatus are simply illustrative of an application of the principles of the invention and many other modifications, alterations, or changes may be made without departing from the spirit and scope of the invention.

What is claimed is:

1. In a telegraph cipher system having means for generating signals consisting of a predetermined number of intelligence impulses plus an ultra codal impulse, means for enciphering the intelligence impulses, means for storing the resultant encipherment of said intelligence impulses, means under the control of said ultra codal impulse for effectuating the transmission of said encipherment, means for continually operating the enciphering means independently of the generation of the signals, and means for suppressing the effect of the operation of the enciphering means when the signal generating means fails to generate said ultra codal impulse with each signal, whereby only blank signals are transmitted.

2. In a telegraph cipher system having means for generating signals, each signal comprising a group of permutation code signal impulses of a predetermined communication signal code accompanied by an ultra codal signal impulse of predetermined nature, a first storage means for storing a group of said permutation code signal impulses and its ultra codal signal impulse, enciphering means comprising key tape sensing means and contacts controlled thereby, continually operable means for continually actuating said key tape sensing means to operate said contacts to effectuate conjointly with said first storing means the encipherment of each group of permutation code signal impulses, a second storage means for storing the resultant enciphered group of permutation code signal impulses, said second storage means including facilities for storing said ultra codal signal impulse without alteration, a transmitting distributor, transfer control means controlled by said facilities for effectuating under the control of said ultra codal signal impulse the transfer of said resultant enciphered group of permutation code signal impulses to said transmitting distributor, said transfer control means effective upon the failure of the generating means to generate an ultra codal signal impulse with each group of permutation code signal impulses to suppress the transfer of said resultant enciphered group of permutation code signal impulses, whereby blank signals are transmitted by said transmitting distributor.

3. In a telegraph cipher system having means for generating signals, each signal comprising a group of permutation code signal impulses of a 5-unit communication signal code accompanied by a sixth impulse of predetermined nature, a first storage means for storing a group of said permutation code signal impulses and said sixth impulse, enciphering means comprising key tape sensing means and contacts controlled thereby, continually operable means for continually actuating said key tape sensing means to operate said contacts to effectuate conjointly with said first storing means the encipherment of each group of permutation code signal impulses, a second storage means for storing the resultant enciphered group of permutation code signal impulses, said second storage means including facilities for storing said sixth impulse without alteration, a transmitting distributor, transfer control means controlled by said facilities for effectuating under the control of said sixth impulse the transfer of said resultant enciphered group of permutation code signal impulses to said transmitting distributor, said transfer control means effective upon the failure of the generating means to generate a sixth impulse with each group of permutation code signal impulses to suppress the transfer of said resultant enciphered group of permutation code signal impulses, whereby blank signals are transmitted by said transmitting distributor.

4. In a telegraph cipher system having means for generating signals, each signal comprising a group of permutation code signal impulses of a 5-unit communication signal code accompanied by a sixth impulse of predetermined nature, a first storage means for storing a group of said permutation code signal impulses and its sixth impulse, means for enciphering the groups of permutation code signal impulses, means for storing the resultant encipherment of said permutation code impulses, means under the control of said sixth impulse for effectuating the transmission of said encipherment means for continually operating the enciphering means independently of the generation of the signals, and means for suppressing the effect of the operation of the enciphering means when the signal generating means fails to generate said sixth impulse with each signal, whereby only blank signals are transmitted.

5. In a telegraph cipher system having means for generating signals, each signal comprising a group of permutation code signal impulses of a predetermined communication signal code accompanied by an ultra codal signal impulse for predetermined nature, a first storage means for storing a group of said permutation code signal impulses and its ultra codal impulse, means for enciphering the groups of permutation code signal impulses, means for storing the resultant encipherment of said permutation code impulses, means under the control of said ultra codal impulse for effectuating the transmission of said encipherment, means for continually operating the enciphering means independently of the generation of the signals, and means for suppressing the effect of the operation of the enciphering means when the signal generating means fails to generate said ultra codal impulse with each signal, whereby only blank signals are transmitted.

6. In a telegraph cipher system having means for generating signals consisting of a predetermined number of intelligence impulses plus an ultra codal impulse, key-tape controlled means for enciphering the intelligence impulses, said enciphering means comprising key-tape sensing instrumentalities and contacts controlled thereby, means for continually actuating said instrumentalities to operate said contacts to effectuate jointly with said generating means the encipherment of said intelligence impulses, means under the control of said ultra codal impulse for effectuating the transmission of said encipherment, and means for suppressing the effect of the operation of the enciphering means when the signal generating means fails to generate said ultra codal impulse with each signal, whereby only blank signals are transmitted.

References Cited in the file of this patent

UNITED STATES PATENTS 2,406,829 Haglund et al. ............ Sept. 3, 1946